United States Patent [19]

Daspit

[11] 4,140,890
[45] Feb. 20, 1979

[54] UNDERWATER SUBMERSIBLE GASEOUS CUTTER FOR SUBMERGED PIPE LINES

[76] Inventor: Ronald A. Daspit, 2401 Delille St., Chalmette, La. 70043

[21] Appl. No.: 784,339

[22] Filed: May 2, 1977

[51] Int. Cl.$^2$ .............................................. B23K 9/12
[52] U.S. Cl. ................................ 219/68; 219/69 W; 219/72
[58] Field of Search .................. 219/68, 69 W, 69 M, 219/60 A, 61, 72, 74

[56] References Cited

U.S. PATENT DOCUMENTS

| 3,102,187 | 8/1963 | Coscia | 219/60 A |
|---|---|---|---|
| 3,678,239 | 7/1972 | Hill | 219/60 A |
| 3,777,103 | 12/1973 | White | 219/60 A |
| 3,840,170 | 10/1974 | Arikawa | 219/60 A |
| 3,841,000 | 10/1974 | Simon | 34/342 |
| 4,051,342 | 9/1977 | Stubbings | 219/60 A |

FOREIGN PATENT DOCUMENTS

| 1411529 | 8/1965 | France | 219/60 A |
|---|---|---|---|
| 2031728 | 11/1970 | France | 219/72 |

OTHER PUBLICATIONS

Giachino et al., Welding, Skills and Practice published by American Technical Society, Chicago, Ill., 1976, p. 327, FIG. 32-6 relied on.

Primary Examiner—Richard R. Kucia
Attorney, Agent, or Firm—Charles Richard Werner

[57] ABSTRACT

An underwater cutter for submerged pipelines employing $O_2$ or gaseous hydrogen fluoride and a continuously fed electrode to provide high temperature cutting means, said electrode being carried by a motor driven spool in a housing on rollers contacting the pipe, one of said rollers being electrically driven, an adjustable bracket carried by the housing and having rollers substantially opposed to the first mentioned rollers, a knife edge carried by the housing adapted to ride in a precut slot on the pipe for guiding the cutter about the pipe, with suitable connections on the housing from a power source, a compressed air source, a source of $O_2$ or gaseous hydrogen fluoride, a welding cable, and a ground connection.

7 Claims, 5 Drawing Figures

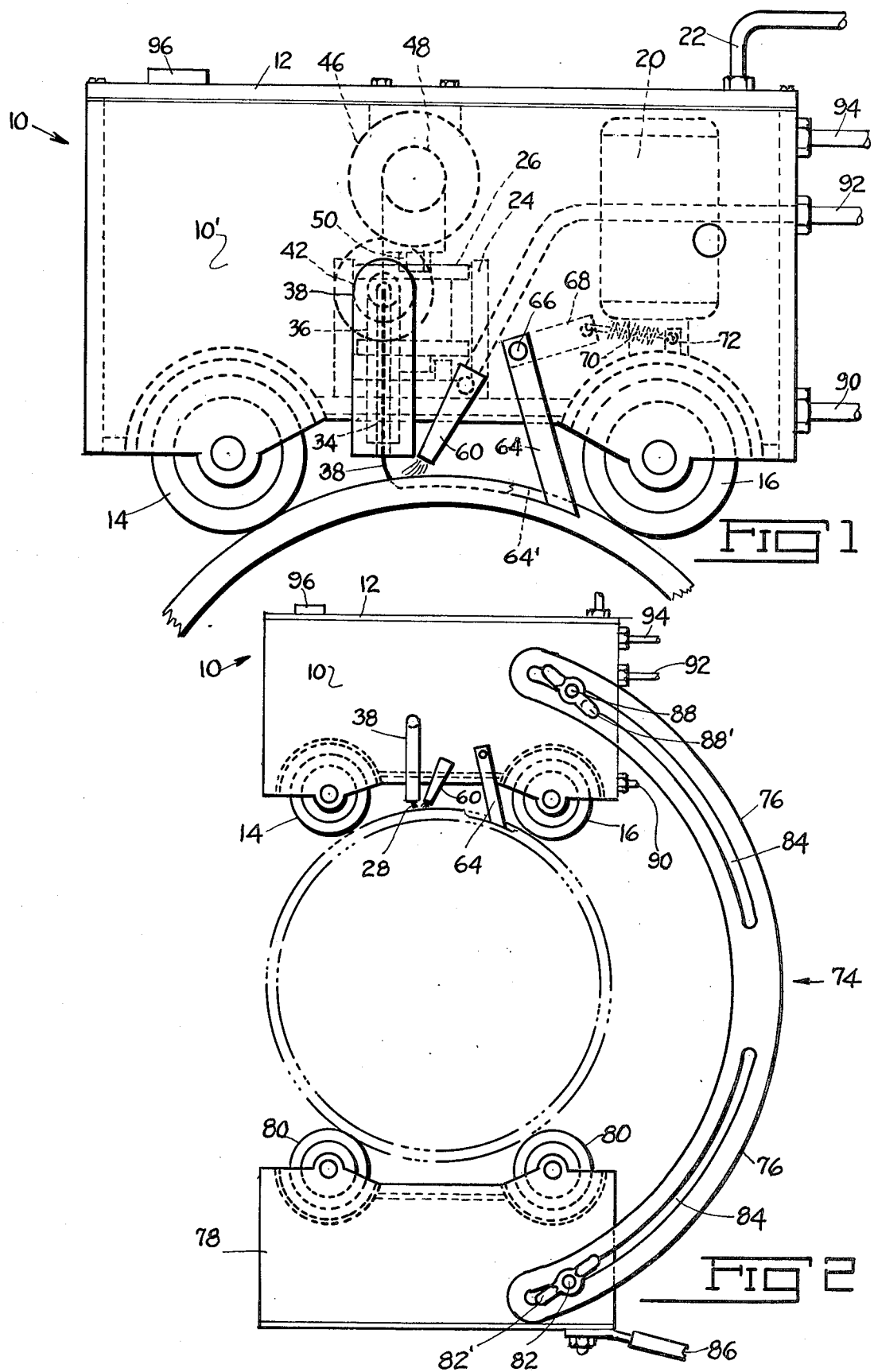

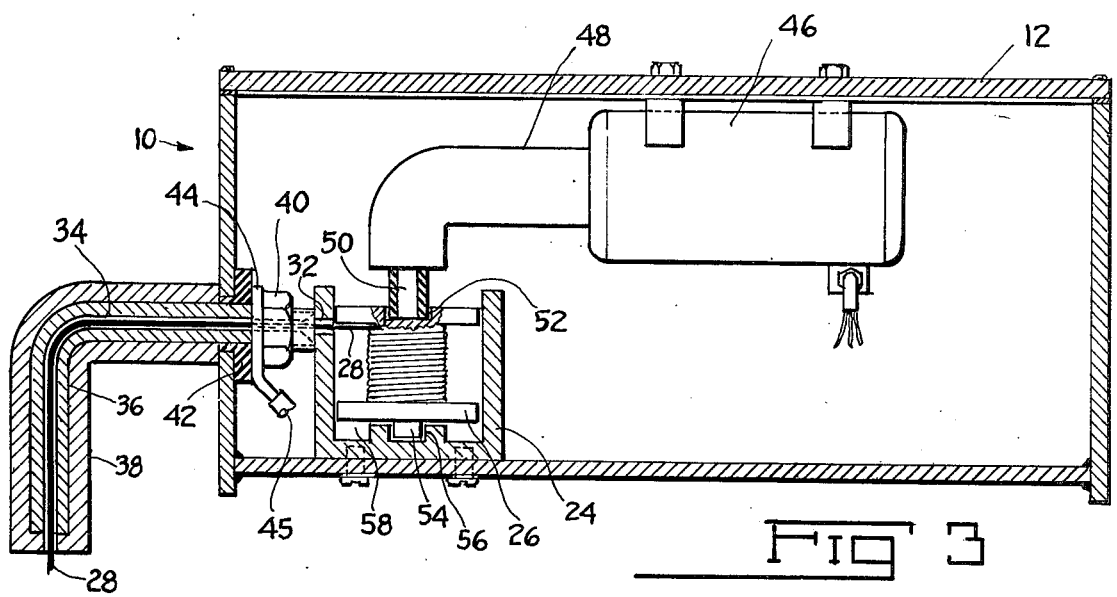
Fig 3
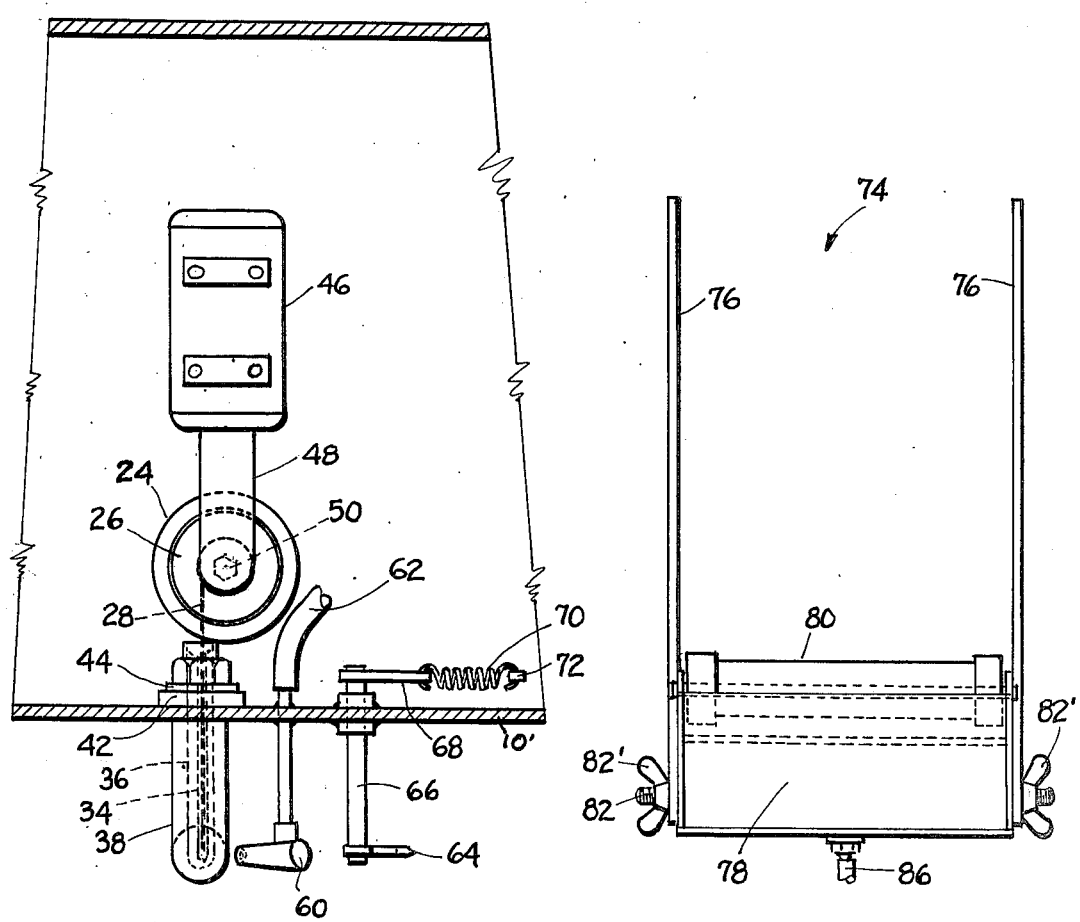
Fig 4
Fig 5

UNDERWATER SUBMERSIBLE GASEOUS CUTTER FOR SUBMERGED PIPE LINES

FIELD OF THE INVENTION

This invention relates to the art of underwater cutting of pipelines. Many pipelines are laid on the bottom surfaces of bodies of water and are used for the transmission of petroleum and other fluids. These pipelines often develop leaks due to corrosion of the pipelines or breakage caused by movement of such pipelines by the underwater currents. In order to make suitable repairs it is necessary to cut the pipeline before placing the repair unit between the two sections of pipe or raising the ends of the pipe to the surface of the water to effect the repairs.

DESCRIPTION OF THE PRIOR ART

It is known that many types of underwater cutters exist in the prior art. Among these are manual cutters, oxy-arc and flame type cutters, and mechanical cutters. As a rule, manual cutters are limited as to the size of pipe and thickness of pipe walls which they can cut. They are slow to operate and leave burrs inside and outside the pipe. Furthermore, they are difficult to set in correct cutting alignment.

Oxy-arc and flame type cutters require an exceptionally capable underwater diver in order to do an efficient job. These type cutters tend to leave slag formations inside and outside of the pipe. They are also extremely hazardous to the diver because of the danger of explosions from entrapped fumes and gasses.

Mechanical cutters are bulky and require lifting equipment and hoists to assist the diver in the proper installation on the pipeline. Even when working properly, mechanical cutters are slow, subject to frequent breakdowns because of damage to cutting elements should the pipe flex or move during the cutting operation or installation of the cutter.

SUMMARY OF THE INVENTION

A preferred embodiment of the present invention comprises a housing adapted to travel about the circumference of a pipe on rubber rollers one of which is a drive roller driven by an electric motor within the housing. A knife edge guide element projecting from the housing rides in a precut slot and guides the cutter around the pipe.

The housing carries a welding cable terminal and an $O_2$ or HF outlet as well as a continuously fed electrode wire in close proximity to the $O_2$ or HF outlet correctly positioned in relation to the pipe in order to cut same as the cutter housing rotates at a predetermined speed about the pipe. The electrode wire is carried on a removable spool and driven by a variable speed electric motor carried in the housing, a suitable speed gear reduction unit being employed for proper feeding of the electrode wire.

An adjustable bracket formed with two spaced arms is carried at one end by the housing and extends arcuately about the pipe, the other end of the bracket being provided with two steel rollers which are substantially diametrically opposed to the rollers on the housing when the entire unit is properly assembled on the pipe. A ground connection is carried by the bracket.

The cutter assembly is self-aligning, has zero buoyancy and is operated from the surface once it is installed underwater and the need for an experienced diver is unnecessary. All danger to a diver is eliminated because he is not in close proximity to the unit. No special lifting equipment is required.

Should jamming of the knife edge which guides the cutter occur, it can easily be disconnected without removal and reinstallation of the cutter, permitting the cutter to function without interruption.

No bulky hydraulic equipment is needed for the cutter which merely requires the diver's air compressors and the small welding machine supplied with a 110 volt outlet, all of which is normally found in pipe line operations.

Sea conditions will not affect cutter installation as lifting cranes or other devices are not required to lift, lower or locate the cutter for the diver.

Because of the adjustable bracket which is interchangeable, the cutter can be adapted to any size pipe. Furthermore, it is self-aligning by use of the rollers and can always be returned to the slot by use of the knife edge therein.

The cutter will be less costly than hydraulic equipment because of its smaller size and its adaptability to high production methods.

Slag formation is minimal with $O_2$ due to small diameter of feed wire and steady motion of cutter as opposed to large electrodes and unsteady movement of a hand operated cutting torch. With use of gaseous hydrogen fluoride there is no slag formation and a greater cutting speed can be achieved.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of their scope, for the invention may admit to other equally effective embodiments.

In the drawings:

FIG. 1 is a side elevational view of the cutter assembly mounted on a tubing, a portion of the circumference of which is shown.

FIG. 2 is a reduced side elevational view of the cutter assembled on a pipe and showing the bracket arrangement for holding the cutter in position on said pipe.

FIG. 3 is an enlarged detailed sectional view through the cutter housing showing the electrode spool and feeding arrangement.

FIG. 4 is a partial top view of the structure of FIG. 3, showing portions in section and elevation, illustrating the electrode feeder, the $O_2$ or HF outlet and the knife edge device for guiding the cutter.

FIG. 5 is a top plan view of the brackets and rollers for retaining the cutter on the pipe.

DESCRIPTION OF THE PREFERRED EMBODIMENTS

Referring to the drawings by numerals of reference, in FIG. 1, is shown a housing 10 with top 12 suitably secured to the housing in a watertight manner, said housing having two rollers 14 and 16 journalled therein and extending below the bottom edge 18 of said housing, both rollers being made of rubber, neoprene or other suitable material. Roller 16 is driven by a variable speed motor 20 mounted within the housing and connected to a suitable power source through waterproofed external connection 22 in the top 12 of the housing 10.

Mounted within the housing 10 is a cylindrical housing 24 which carries therewithin a spool 26 on which a supply of electrode wire 28 is wound, the cylindrical housing and the spool being made of a non-conductive material.

The electrode wire 28 extends through an aperture 32 in the wall of the cylindrical housing 24 and through aperture 34 in a brass L-shaped fitting 36 covered with an insulated material cover 38 and threadedly held in place by lock nut 40, an insulated washer 42 surrounding the brass fitting where it passes through the wall 10' of the housing 10, a welding lead collar 44 also being carried on the threaded end of the brass fitting 36 and held in place by the lock nut 40, a suitable welding lead conductor 45 being connected to said collar 44.

The spool 26 is driven by a variable speed gear reducer electric motor 46 mounted to the cover or top 12 of the housing 10, said motor having a right angle drive 48 with a hexagon terminal 50 insertable in hexagonal aperture 52 in the top of the spool 26. The bottom of said spool 26 is provided with an extending stub shaft 54 rotatably received in aperture 56 in the bottom 58 of the cylindrical housing 24.

Many of the features just described are shown also in the top view (FIG. 4). Also shown in this figure and in FIGS. 1 and 2 is a cutting nozzle 60 which extends out through the side wall 10' of the housing 10 to a point adjacent the electrode wire 28, the nozzle being supplied with $O_2$ or hydrogen fluoride through tubing 62.

In FIGS. 1, 2 and 4 are shown the knife edge guide 64, externally of the housing 10, a shaft 66 carrying said guide and extending into the interior of the housing 10, said shaft carrying an arm 68 connected to one end of spring 70 the other end of which is connected to lug 72, and thereby urging the knife edge guide 64 into contact with a precut groove 64' shown by dotted lines in FIG. 1. This groove 64' is made by the cutting action of the wire electrode and oxygen, the knife edge being urged into place in the groove as it reaches same upon initial cutting thereof by the cutting torch action. Jamming of the knife edge, should it occur, is overcome by the diver who merely removes the knife edge 64 from the shaft 66, advances the cutter on the pipe, installs a new knife edge and starts the cutter again.

To maintain the cutter on the pipe there is provided a bracket assembly 74 formed of two arcuate bracket arms 76 at the lower end of which is carried a cross frame 78 in which two parallel steel rollers 80 are pivotally mounted. An insulated adjustment bolt 82 with insulating washer and sleeve (not shown) and wing nut 82' pass through the arcuate slots 84 in the arms 76 and are threadedly secured to the cross frame 78. A ground lead cable 86 is secured to the cross frame 78 so that current can pass through the steel rollers 80 to make a ground connection to the pipe. Different size bracket arms 76 can be used for different size pipe. The upper portions of the bracket arms 76 are suitably mounted to the housing 10 by bolts 88 and wing nuts 88'.

In FIG. 1 is shown an air fitting 90 for connection to an air hose for introduction from the surface of compressed air or some other gaseous medium into the housing 10 to maintain a relatively dry atmosphere therein, thus eliminating the need for use of submersible motors and also insulating against shorting out electrode wire 28. An $O_2$ fitting 92 for receiving the oxygen supply hose 62, and a connection 94 for the welding cable are located externally of the housing 10. A wafer type popoff valve 96 is provided in the top 12 of the housing to eliminate the necessity of closely maintaining internal pressure in the housing 10 due to introduction of compressed air to the interior of the housing. A steady flow of air at the desired pressure from the surface can be maintained and any excessive pressure will be relieved by escaping through the popoff valve. The relatively thin walls of the rectangular housing can not tolerate any excessive external or internal pressure.

The cutter unit is installed by a diver who sets the cutter on top of the pipe and swings the rollers 80 into position at the bottom of the pipe, tightening the wing nuts 82' and 88'.

With the electrode wire 28 extending through aperture 32 into proper cutting position the $O_2$ or other gaseous medium such as hydrogen fluoride is fed to the cutter and the motor 46 is energized starting the cutter to rotate about the pipe being cut and at the same time feeding the electrode wire 28 whereby the cutting operation proceeds at a steady rate, with the knife edge 64 riding in the precut groove 64' thus guiding the cutter around the pipe until finally the pipe is completely cut through, at which time the cutter action can be terminated, the diver releases the cutter by loosening the fastening members 82 and 88, swinging the rollers 80 free of the pipe. Then, by increasing the air pressure within the housing 10, the cutting unit will float to the surface of the water for retrieval. If another cut is to be made the cutter is merely moved to and installed in its new position and the operation repeated.

From the foregoing it will be seen that I have invented a simple, easy to operate, relatively inexpensive to construct, cutter for underwater pipe which, insofar as I am aware, is far superior to anything now available to the trade, and I claim all rights to such changes and modifications which come within the scope of these specifications and the claims which follow.

What I claim as new and desire to secure by Letters Patent is:

1. An underwater submersible gaseous cutter for submerged pipe lines, comprising a watertight housing, spaced rollers carried by the housing and adapted to contact the submerged pipe line to be cut, a bracket having one end adjustably carried by the housing, a pair of rollers adjustably carried by the other end of the bracket, and adapted to bear against the pipe line to be cut in a position substantially opposite the first mentioned pair of rollers, a gaseous feeding cutting nozzle carried by and offset from the housing and in close proximity to the pipe line to be cut, a motor within the housing adapted to drive at least one of the rollers on the housing for movement of the cutter about the pipe line.

2. The underwater cutter as described in claim 1, said housing including an electrode carried by a spool within the housing, said spool being actuated by a second motor for continuously feeding said electrode as the gaseous cutter commences its cutting operation and leaves an initial groove as it rotates about the pipe line.

3. The underwater cutter as described in claim 2, including an offset knife edge carried by the housing and adapted to rest in the groove made by the cutter for guiding same as it rotates about the pipe line being cut.

4. The underwater cutter as described in claim 1, including a source of compressed air, a source of current for the motor, and a source of a gaseous cutting fluid for the gaseous feeding cutting nozzle and the electrode.

5. The underwater cutter as described in claim 1, said rollers carried by the bracket being conductive, and a ground electrical connection to said rollers.

6. The underwater cutter as described in claim 4, said housing being substantially hermetically sealed whereby its buoyancy can be controlled by the compressed air supplied to said housing, and means for varying the air compression within said housing.

7. The underwater cutter as described in claim 1, said bracket being formed of spaced arms, said rollers carried by the bracket being journalled in a carrier to which the arms are adjustably mounted, and a ground connection carried by said carrier.

* * * * *